United States Patent
Khamooshi et al.

(10) Patent No.: US 11,507,916 B2
(45) Date of Patent: Nov. 22, 2022

(54) FLIGHT LINE DELIVERY SCHEDULING SYSTEMS AND METHODS

(71) Applicant: The Boeing Company, Chicago, IL (US)

(72) Inventors: Shabnam Khamooshi, Mill Creek, WA (US); Sharon F. Arroyo, Sammamish, WA (US); Wallace C. O'Rear, North Charleston, SC (US)

(73) Assignee: The Boeing Company, Chicago, IL (US)

( * ) Notice: Subject to any disclaimer, the term of this patent is extended or adjusted under 35 U.S.C. 154(b) by 360 days.

(21) Appl. No.: 16/267,064

(22) Filed: Feb. 4, 2019

(65) Prior Publication Data
US 2020/0250618 A1   Aug. 6, 2020

(51) Int. Cl.
*G06Q 10/06* (2012.01)
*G06Q 10/08* (2012.01)
*G06Q 10/04* (2012.01)

(52) U.S. Cl.
CPC ....... *G06Q 10/08355* (2013.01); *G06Q 10/04* (2013.01); *G06Q 10/06312* (2013.01)

(58) Field of Classification Search
CPC ............ G06Q 10/08355; G06Q 10/04; G06Q 10/06312
See application file for complete search history.

(56) References Cited

U.S. PATENT DOCUMENTS

| | | | |
|---|---|---|---|
| 8,560,368 B1* | 10/2013 | Maity | G06Q 10/20 705/7.13 |
| 9,841,501 B1 | 12/2017 | Salour et al. | |
| 9,892,558 B2 | 2/2018 | Troy et al. | |
| 2001/0032110 A1* | 10/2001 | Sinex | G06Q 40/08 701/29.4 |
| 2002/0013631 A1* | 1/2002 | Parunak | G06Q 10/0635 700/28 |

(Continued)

OTHER PUBLICATIONS

Wall, Cindy, They Deliver for you: Airplane Delivery Centers Strive for perfection, Mar. 2004, Boeing Frontiers, vol. 02, Issue 10 , www.boeing.com/news/frontiers/archive/2004/february/ts_sf.html. (Accessed Jan. 22, 2021) (Year: 2004).*

(Continued)

*Primary Examiner* — Emmett K. Walsh
*Assistant Examiner* — Larita L. Yusuf
(74) *Attorney, Agent, or Firm* — Quinn IP Law

(57) ABSTRACT

Systems and methods for determining an aircraft flightline delivery schedule are disclosed. In one embodiment a method includes receiving a set of milestones for delivery of the plurality of aircraft, receiving a set of costs for set of milestones, receiving a set of scheduling constraints, generating a network flow chart for each aircraft in the plurality of aircraft, the network flow chart having an order of milestones for delivery of the aircraft, determining a cost of delivery for each aircraft in the plurality of aircraft based on the network flow chart and the set of costs for the milestones, determining the aircraft flight line delivery schedule for delivery of the plurality of aircraft based on reducing a total cost for delivery of the plurality of aircraft, and outputting the determined aircraft flight line delivery schedule.

18 Claims, 7 Drawing Sheets

(56) References Cited

U.S. PATENT DOCUMENTS

| | | | |
|---|---|---|---|
| 2003/0130861 A1* | 7/2003 | Seitz | G06Q 30/0283 |
| | | | 705/400 |
| 2003/0195794 A1* | 10/2003 | Yasuda | G05B 19/418 |
| | | | 705/7.25 |
| 2004/0162811 A1* | 8/2004 | Wetzer | G06Q 10/06 |
| 2010/0217640 A1* | 8/2010 | Nichols | G06Q 10/06 |
| | | | 705/7.12 |
| 2016/0086140 A1* | 3/2016 | Sumioka | G06Q 10/063112 |
| | | | 705/7.14 |
| 2018/0060829 A1* | 3/2018 | Gillen | G06Q 10/083 |
| 2020/0074411 A1* | 3/2020 | Hughes | G06Q 10/20 |

OTHER PUBLICATIONS

Huetter, John, GFS: Paint booth maintenance crucial to avoid costly breakdowns, Jan. 6, 2017, Repairer Driven News, https://www.repairerdrivennews.com/2017/01/06/gfs-paint-booth-maintenance-crucial-to-avoid-costly-delays-and-make-sure-to-get-all-the-filters/ (Accessed Jan. 25, 2021) (Year: 2017).*

Huang, G.Q., Zhang, Y.F., Chen, X. et al. RFID-enabled real-time wireless manufacturing for adaptive assembly planning and control. J Intell Manuf 19, 701-713 (2008). https://doi.org/10.1007/s10845-008-0121-5 (Year: 2008).*

Li, Xiangzhen; Krejci, Caroline; MacKenzie, Cameron A.; Jackman, John K.; Hu, Guiping; Hu, Charles Y.; Graunke, Adam A.; and Burnett, Gabriel A., "Capacity Planning and Production Scheduling for Aircraft Painting Operations" (2017). (Year: 2017).*

* cited by examiner

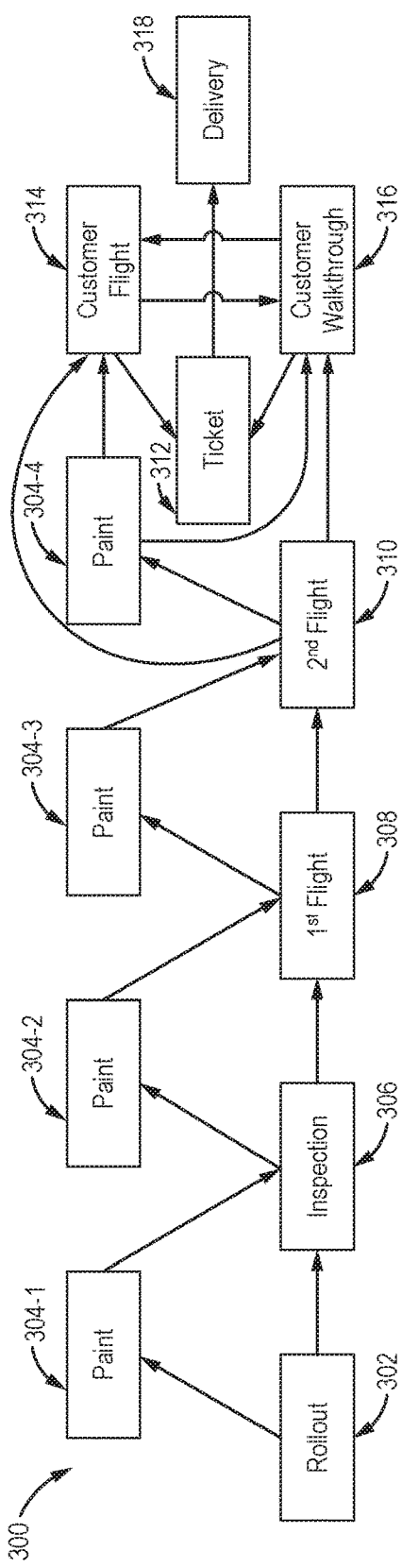
FIG. 3
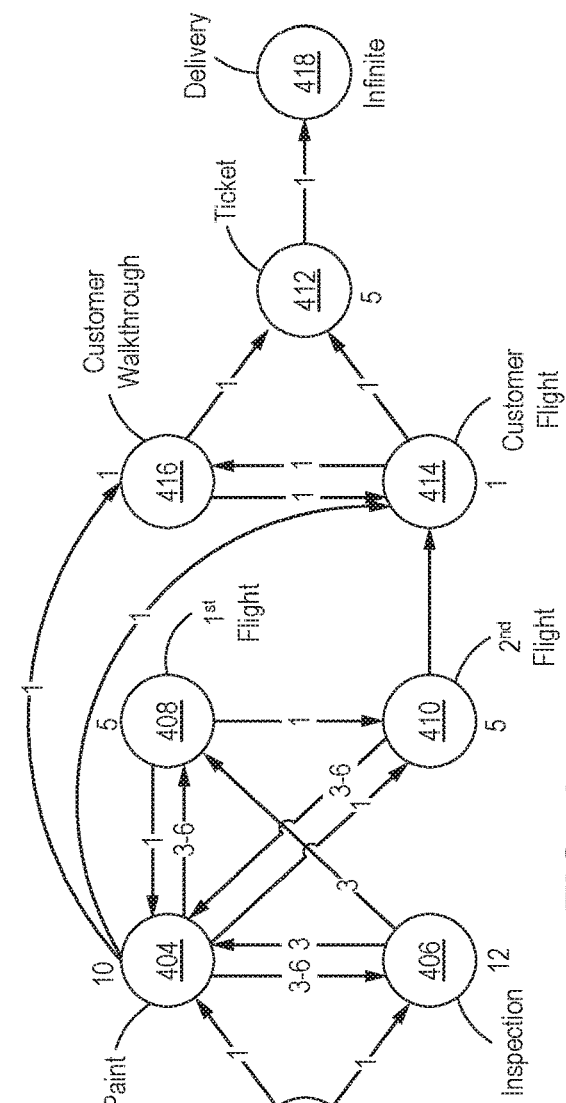
FIG. 4
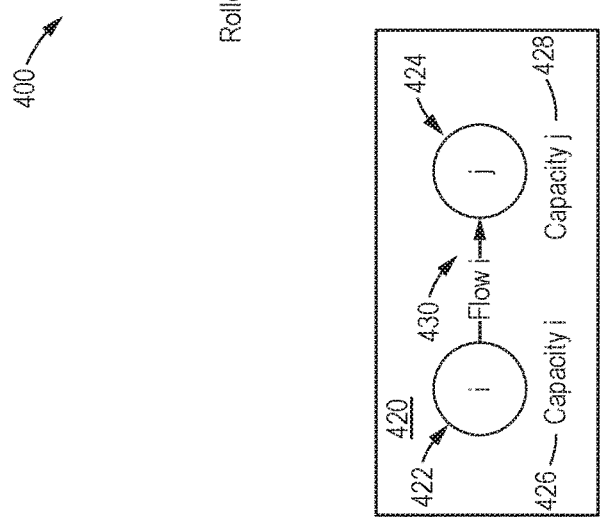

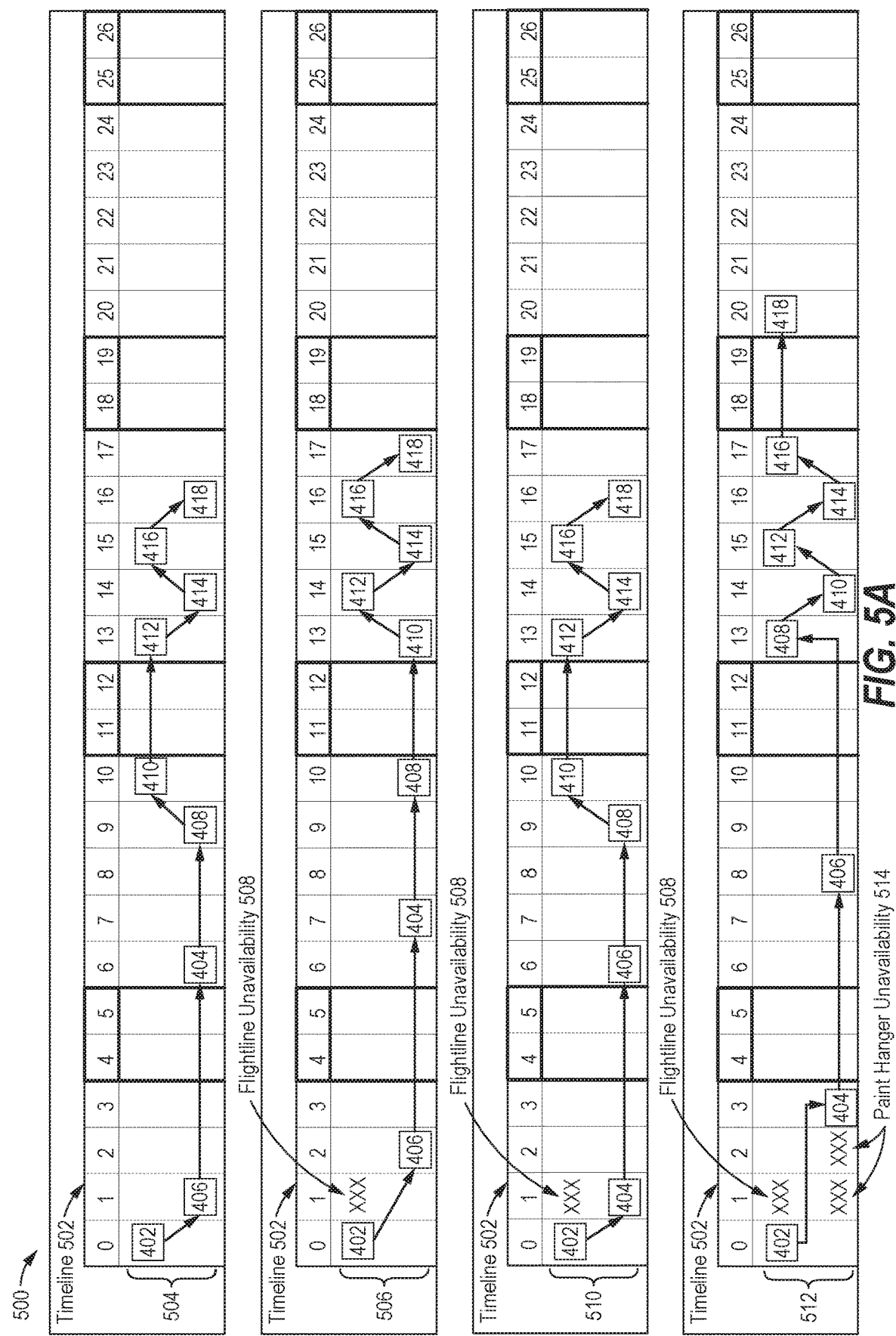

| 620 | Timeline 622 → | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|---|
| Rollout | 602 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Inspection | 606 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Paint | 604 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1st Flight | 608 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2nd Flight | 610 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Ticket | 612 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Customer Walk. | 616 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Customer Flight | 614 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Delivery | 618 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

*FIG. 6A*

FLIGHT LINE DELIVERY SCHEDULING SYSTEMS AND METHODS

TECHNICAL FIELD

The present disclosure generally relates to systems and methods of scheduling flight line delivery (e.g., aircraft production) of aircraft.

BACKGROUND

Aircraft go through several milestones after they roll out of the factory and into the flightlines and delivery centers for customers. The milestones include inspections, painting, ticketing, customer walkthroughs, manufacturer test flights, customer test flights, delivery, and the like. Many of these milestones may be scheduled in any order, and executing these milestones requires resources. For example, an aircraft may be in a paint hanger for several days while being painted, a flightline must be available to perform an inspection, and a flight crew must be available to perform test flights.

Different scheduling options include painting an aircraft before or after test flights and inspections, painting at a manufacturer facility or an outsourced facility and the like. When performing all the final delivery steps for multiple aircraft at the same time, determining an optimized schedule for the final delivery tasks for all aircraft easily becomes a time-consuming task. Given the sheer number of combinations and permutations of scheduling the events, it would be impossible to complete a flight line delivery schedule in a time period to be useful for the delivery of those aircraft without the use of computer processing equipment.

Present systems and methods for scheduling flight line delivery tasks of aircraft include compiling numerous spreadsheets and involves a manually intensive trial-and-error process of attempting to produce a flight line delivery schedule. This is an extremely time intensive effort and often produces sub-optimal results that have higher costs and delivery lead times than what could be achieved.

SUMMARY OF THE DISCLOSURE

In one aspect of the present disclosure a method includes receiving a set of milestones for flight line delivery of the plurality of aircraft, receiving a set of costs for the set of milestones, receiving a set of scheduling constraints, and generating a network flow chart for each aircraft in the plurality of aircraft. The network flow chart includes an order of milestones for flight line delivery of the aircraft. The method further includes determining a cost of flight line delivery for each aircraft in the plurality of aircraft based on the network flow chart and the set of costs for the set of milestones, and determining the aircraft flight line delivery schedule for flight line delivery of the plurality of aircraft based on reducing a total cost for flight line delivery of the plurality of aircraft. The determined aircraft flight line delivery schedule is then output.

In another aspect of the present disclosure, an aircraft flight line delivery schedule optimizer system is disclosed. The system includes an output device and an optimization module. The optimization module is configured to receive a set of milestones for the flight line delivery of a set of aircraft to be delivered, receive a set of scheduling constraints associated with the set of aircraft to be delivered, and determine a flight line delivery schedule for the set of aircraft. The flight line delivery schedule for the set of aircraft includes a minimized cost for the flight line delivery of the set of aircraft.

Additional aspects are defined by the claims of this patent.

BRIEF DESCRIPTION OF THE DRAWINGS

FIG. 3 depicts an example flow path for the flight line delivery of an aircraft, in accordance with an embodiment of the present disclosure;

FIG. 4 depicts a network flow chart, in accordance with an embodiment of the present disclosure;

FIGS. 5A and 5B depict views of a plurality of time-expanded networks, in accordance with an embodiment of the present disclosure; and FIGS. 6A and 6B depict views of a plurality of steps of modeling a network flow chart, in accordance with an embodiment of the present disclosure.

DETAILED DESCRIPTION

Figure 1:
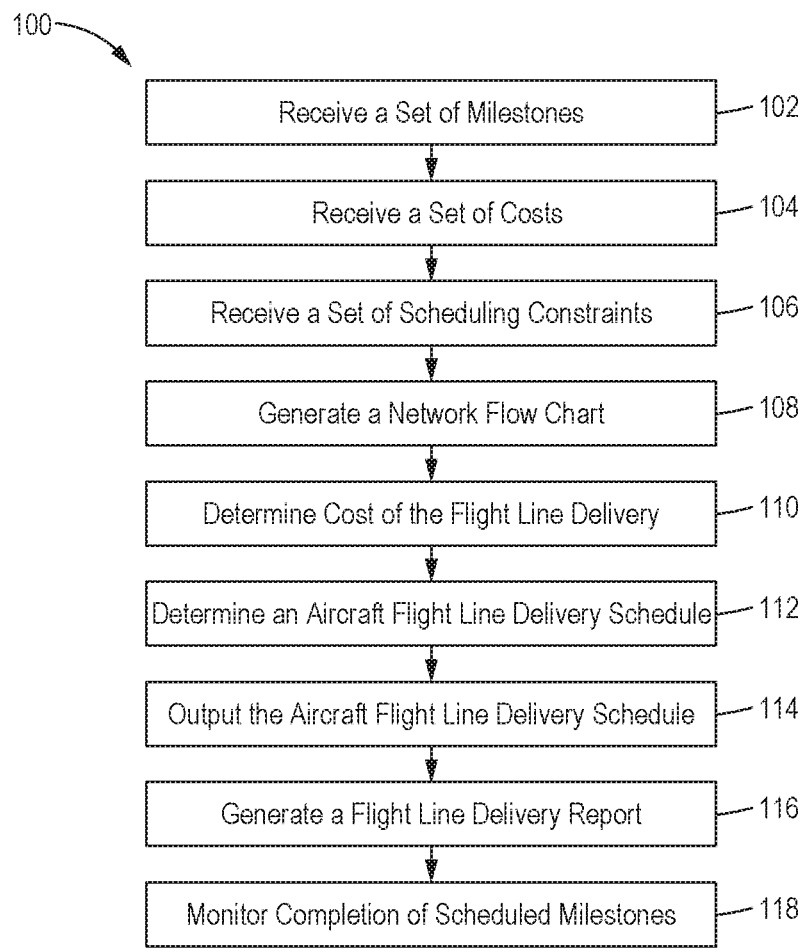
FIG. 1 depicts a method of determining an aircraft flight line delivery schedule, in accordance with an embodiment of the present disclosure.

FIG. 1 depicts a method, in accordance with an embodiment of the present disclosure. In particular, FIG. 1 depicts the method 100 of determining an aircraft flight line delivery schedule for the delivery of a plurality of aircraft. The method 100 includes receiving a set of milestones at block 102, receiving a set of costs at block 104, receiving a set of scheduling constraints at block 106, generating a network flow chart at block 108, determining a cost of the flight line delivery at block 110, determining an aircraft flight line delivery schedule at block 112, outputting an aircraft flight line delivery schedule at block 114, generating a flight line delivery report at block 116, and monitoring completion of scheduled milestones at block 118. The aspects of the method 100 will be explained throughout the disclosure, but are introduced here in the discussion of FIG. 1.

At block 102, a set of milestones for the flight line delivery of the plurality of aircraft is received. As used throughout the present disclosure, flight line delivery of the aircraft comprises performing all of the final delivery steps between rollout and final delivery. Thus, it is not envisioned that initial assembly steps (e.g., forming of the flight body, installation of electronics, and the like) be included in planning of the flight line delivery of the aircraft's final delivery steps. In some embodiments, the set of milestones includes a rollout milestone, a painting milestone, a customer walkthrough milestone, a test flight milestone, a customer flight milestone, a ticket event milestone, and a delivery milestone. It is to be noted that each aircraft delivered may include all of these milestones, some of these milestones, or additional milestones as required for the flight line delivery of the aircraft.

The rollout milestone may be the date that the aircraft is ready to commence the performance of the remaining milestones before final delivery of the aircraft to a customer.

The paint milestone includes the painting of an exterior surface of the aircraft and may occur within a paint hanger. The paint hanger may be an in-house paint hanger associated with the manufacturer of the aircraft or it may be an out-sourced paint hanger that includes a third party not associated with the aircraft manufacturer painting the aircraft in a third party paint hanger. The painting of the aircraft may take any number of days, and may vary based on customer requirements.

The inspection milestone includes inspecting of the aircraft's structural integrity, a functionality check of the aircraft's electrical and mechanical systems, and the like. The inspection may be performed by the aircraft manufacturer, a third party, or the end customer of the aircraft. The inspection may occur at any suitable location to conduct the various tests and inspections required. In some embodiments, inspections may occur on a flightline, with each flightline having the capacity to perform one inspection on one aircraft per day. Inspections may typically be performed before any test flights.

The test flight is a flight to check the functionality of the aircraft while operating. The test flight may comprise a series of tests and evolutions to be performed on the aircraft before delivery to the end customer. In some embodiments, the set of milestones includes a first test flight and a second test flight that occurs after the first test flight. In such an embodiment, the second test flight may have the same, or a different, set of tests and evolutions to be checked as compared to the first test flight. For example, in a hypothetical scenario of ten evolutions to be performed during the test flights, with the evolutions numbered 1-10, the evolutions 1-5 may be scheduled to be performed during the first test flight and the evolutions 6-10 may be scheduled to be performed during the second test flight. In another embodiment of this hypothetical scenario, each of the evolutions 1-10 may be performed during both the first test flight and repeated during the second test flight. It is certainly envisioned that any combination or separation of evolutions, or repeating of evolutions during a test flight, may be performed.

In some embodiments, an optional, or contingent, test flight is included in the set of milestones of the aircraft flight line delivery schedule. Such an optional test flight would only need to be performed in certain circumstances (e.g., for a re-performance of a test flight evolution) and is not performed in all instances. Including such an optional test flight in the set of milestones may provide for additional flight line delivery scheduling flexibility in the event that the optional, test flight becomes required to retest certain evolutions, or in the event that a scheduled first or second test flight is required to be rescheduled due to weather or other related circumstances.

The customer flight milestone may be similar to the test flight milestone, but may be attended by the customer or their designated representative. While it is envisioned that the customer flight is similar to the test flight, it is also possible that the customer walkthrough includes a separate set of evolutions and performance tests than the test flight.

The customer walkthrough milestone comprises the customer, or their designated representative, performing a walkthrough of the aircraft. The customer walkthrough may result in identifying items to be completed by the manufacturer before delivery of the aircraft to the customer.

A ticket event comprises a transfer of ownership from the manufacturer to the customer. No physical transfer of the aircraft may be needed at this point, however, it is anticipated that certain milestones must be completed before transfer of ownership of the aircraft. For example, an aircraft must be inspected, painted, have passed a test flight, and a customer walkthrough must be completed before a ticket event may occur.

A delivery milestone comprises physical delivery of the aircraft to the customer. In general, the delivery milestone is the final milestone to be completed.

It is envisioned that additional milestones could be added to the set of milestones, or alternate milestones could be substituted to modify the method 100 for the flight line delivery of an alternative good. For example, the method 100 may be utilized for the flight line delivery or maintenance of maritime crafts, and the utilization of dry-docks to perform work on the maritime crafts could be substituted for the use of paint hangers to paint an aircraft. Further, an at-sea trial period may be substituted for a test flight, and the like.

At block 104, a set of costs for the set of milestones is received. The set of costs for the set of milestones may include the cost of completing each milestone in the set of milestones and may also include the cost of transitioning the aircraft from one milestone to each of the next possible milestones. For example, a cost for completing the painting milestone for each aircraft is received. There may be several different costs of completing the painting milestone for each different option to paint the aircraft. As such, there may be a first cost to paint an aircraft at an in-house paint hanger (e.g., a paint hanger associated with the manufacturer of the aircraft), a second cost to paint an aircraft at an out-sourced paint hanger (e.g., a third party contracted with the aircraft manufacturer to paint the aircraft in the third party paint hanger), an additional overtime labor cost for painting the aircraft on weekends, holidays, or extra shifts, and the like.

The set of costs received at block 104 may also include intangible costs. One such example of an intangible cost would be the expected increase in covering warranty repairs, or performing rework, if a milestone is completed via a first option (e.g., at an in-house paint hanger) as compared to completing the milestone via a second option (e.g., at a third party paint hanger). The set of costs may also include any penalty payments for late delivery of the aircraft to the customer.

At block 106, a set of scheduling constraints may be received. The scheduling constraints may apply to each aircraft in the plurality of aircraft being delivered. For example, one scheduling constraint related to each aircraft being delivered may be that each milestone identified as a mandatory milestone (e.g., a milestone that cannot be excluded before delivery) must be scheduled for each aircraft. The scheduling constraints may also include scheduling constraints for the facilities and equipment being utilized to complete the milestones. For example, the total number of aircraft scheduled for each milestone on any given day cannot exceed the capacity of that milestone (e.g., a paint hanger capacity, an inspection flightline capacity, a flight crew capacity for performance of test flights and customer flights). In other words, given a set number of paint hangers or test flight crews, only a set number of aircraft may be painted or perform their test flights, respectively. As such, the constraints may include a milestone duration for each milestone to permit proper accounting for utilization of resources during the scheduled completion of each milestone. The set of scheduling constraints may also include a milestone duration of each milestone, which may further include transition time between one milestone and the next.

Examples of constraints may include a flow balance constraint that ensures that each aircraft completes a milestone is accounted for on each day, ensuring time is scheduled for appropriate maintenance (e.g., scheduling each paint hanger for one day of preventative maintenance each calendar month or other time period), accounting for assigning one paint hanger to each aircraft that is scheduled to being painted for the duration of the painting, and preventing concurrent paint starts in the same livery unless multiple sets of tools are available.

The set of scheduling constraints may further include customer profiles. Examples of constraints within the customer profiles may include days that the customer accepts delivery (e.g., customer only accepts Wednesday deliveries), whether a customer permits out-sourced painting, whether a customer walkthrough must be completed before a customer flight, customer flight requirements, and the like. A customer profile may be unique to each different customer the aircraft manufacturer supplies aircraft to.

At block 108, a network flow chart for each aircraft in the plurality of aircraft is generated. The network flow chart includes possible ordering of milestones for flight line delivery of the aircraft. Generally, a rollout milestone is the first milestone scheduled to be completed and a delivery milestone is the final milestone scheduled to be completed. Other examples include scheduling an inspection milestone after the rollout milestone but before the first flight milestone, and scheduling the painting milestone at any time after the rollout milestone but before either the customer flight milestone or the ticket event milestone. A network flow diagram may be produced for each aircraft in the set of aircraft being delivered. An example network flow diagram is disclosed below in conjunction with the discussion of FIG. 3.

At block 110, a cost of the fight line delivery for each aircraft in the plurality of aircraft is determined based on the network flow chart and the set of costs for the set of milestones. A cost may be determined for each possible permutation of ordering of the milestones. Given the constraints, and possible ordering of the milestones, each individual aircraft may have several thousand possible different paths through a network flow chart. Combining each of these different possible flow paths for the individual aircraft flight line deliveries with the flight line deliveries of dozens of other aircraft soon provides for several million different combinations for scheduling the completion of the milestones, each with a different total cost.

The cost of performance of each milestone may include the cost of performing the milestone via an alternative method (e.g., the cost of painting an aircraft at an in-house paint hanger as compared to the cost of painting an aircraft at a third-party paint hanger), the costs of scheduling the milestones to occur during overtime conditions (e.g., holidays, weekends, extra shifts), and the cost of transitioning between milestones (e.g., the cost of transitioning from Milestone 1 to Milestone 2 to Milestone 3 may be different that the cost of transitioning from Milestone 1 to Milestone 3 to Milestone 2).

At block 112, an aircraft flight line delivery schedule for flight line delivery of the plurality of aircraft is determined based on reducing a total cost for the flight line delivery of the plurality of aircraft. In some embodiments, the total cost of scheduling all of the milestones for all of the aircraft is minimized. The aircraft flight line delivery schedules includes the days that each of the aircraft are scheduled to perform the associated milestones. In determining the aircraft flight line delivery schedule, the set of scheduling constraints is observed to schedule the completion of the milestones.

At block 114, the determined aircraft flight line delivery schedule is output. Outputting the determined aircraft flight line delivery schedule may comprise publishing the aircraft flight line delivery schedule electronically, printing the aircraft flight line delivery schedule, displaying the aircraft flight line delivery schedule digitally on an output device, generating work orders for completion of the milestones per the schedule, allocating resources for the completion of the scheduled milestones, and the like.

At block 116, a flight line delivery report based on the aircraft flight line delivery schedule is generated. The fight line delivery report may include various metrics such as efficiency of each workstation at completing a milestone, time spent at each milestone compared to scheduled time spent at each milestone, overtime costs incurred during flight line delivery of the aircraft, and the like. In some embodiments, the completion of the scheduled milestones is monitored via an aircraft flight line delivery milestone monitoring system.

At block 118, the completion of the milestones is monitored via an aircraft flight line delivery milestone monitoring system. An aircraft flight line delivery milestone monitoring system may comprise various location systems like a radio-frequency identification (RFID) system, a photo-based locating system (e.g. positioning or locationing systems), network connections to maintenance database computers, and the like. The aircraft flight line delivery milestone monitoring system may be configured to detect performance of a milestone. For example, an aircraft may be detected (e.g., by an RFID location system or a visual camera-based detection system) entering a paint hanger at a first time and the aircraft may be detected leaving a paint hanger at a second later time. Thus, it may be assumed that the aircraft has completed its painting milestone during the duration between the first and second times. In another example, the aircraft flight line delivery milestone monitoring system may be configured to access an electronic flight log, and determine that a pilot making a flight-log entry for a test flight for the associated aircraft means the completion of the test flight milestone.

In some embodiments, the flight line delivery reports 224 may be supplemented by information and data obtained from analyzing data from the aircraft flight line delivery milestone monitoring system. For example, a comparison between completed milestones to the scheduled milestones may be analyzed. This analysis may be included in the generated flight line delivery reports 224. The flight line delivery reports 224 may also be used to detect opportunities to improve efficiencies, such as procuring additional sets of tooling, hiring additional staff to increase capacity, and the like.

It is further envisioned that the method 100 may be modified and performed to account for updating a flight line delivery schedule. For example, a first time that the method 100 is performed, some of the aircraft in the set of aircraft may already have completed some of their milestones (e.g., an aircraft having completed painting and inspection, but still requires scheduling of test flights, customer walkthrough, customer flight, ticketing and delivery) or be in the process of completing their milestones (e.g., an aircraft in the middle of a several day painting milestone). The method 100 may be modified to account for a first aircraft that has completed one half of its milestones already, a second aircraft that is in the middle of a milestone (e.g., occupying a paint hanger for the next two days while it is completing its painting milestone), and a third aircraft that has a rollout date in the future.

In yet another embodiment, the aircraft flight line delivery schedule is updated periodically, in response to detecting a triggering event, or in real-time. For example, the aircraft flight line delivery schedule may be updated at the end of each work day to reflect for completed milestones, new aircraft scheduled to be delivered, and the like. Alternatively, the aircraft schedule may be updated weekly, monthly, or the like. In another embodiment, the aircraft flight line delivery schedule may be updated in response to detecting a triggering event (e.g., an aircraft painting milestone being extended past its schedule date). An updated aircraft flight line delivery schedule may include change notifications that highlight scheduling differences between a first version of the aircraft flight line delivery schedule and an updated version of the flight line delivery schedule. In some embodiments, the aircraft flight line delivery schedule is updated in real-time based on inputs from a scheduling module that projects rollout dates for different aircraft and from data from the aircraft flight line delivery milestone monitoring system.

Figure 2:
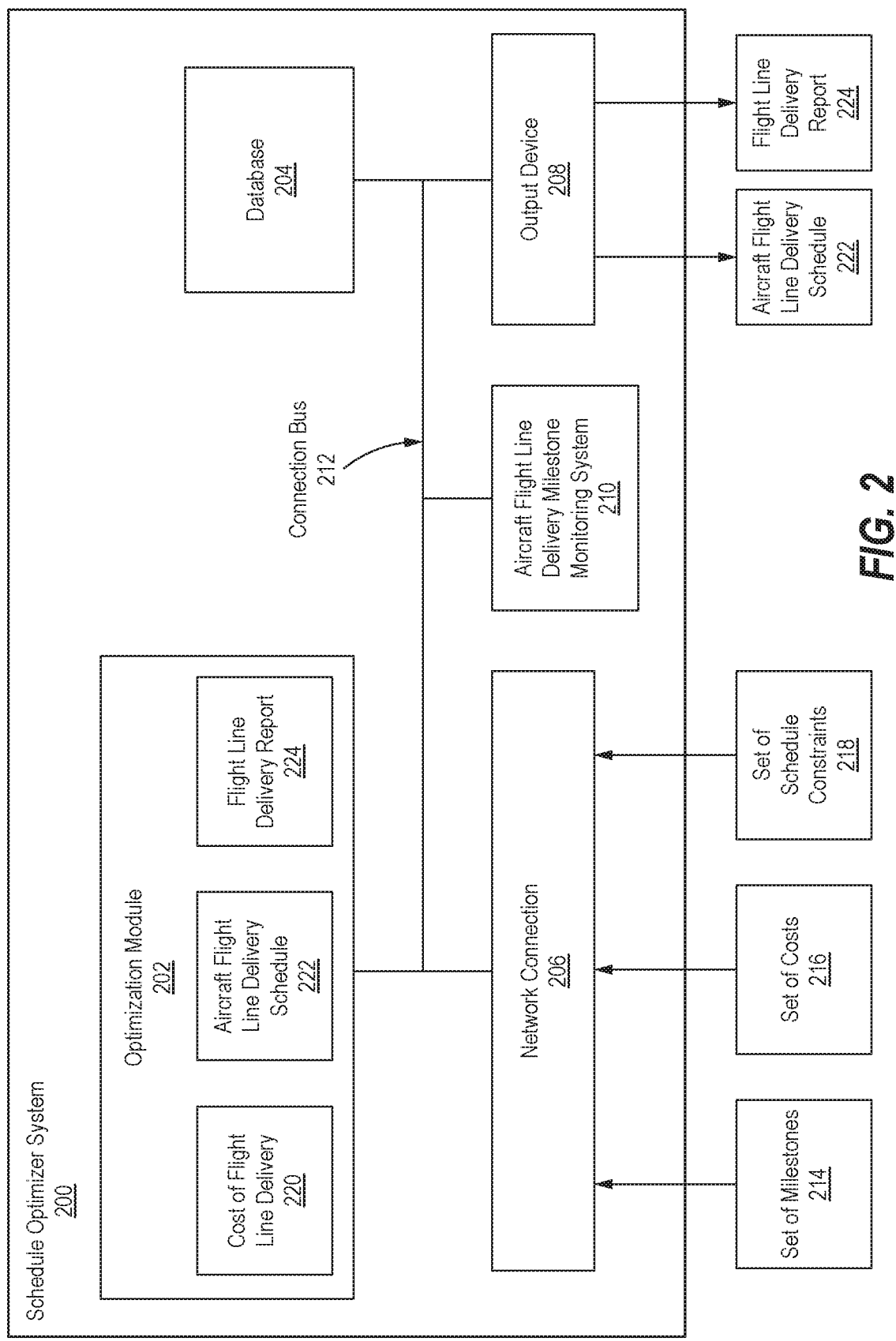
FIG. 2 depicts an aircraft flight line delivery schedule optimizer system, in accordance with an embodiment of the present disclosure.

FIG. 2 depicts an aircraft flight line delivery schedule optimizer system, in accordance with an embodiment of the present disclosure. In particular, FIG. 2 depicts the aircraft flight line delivery schedule optimizer system 200 that includes an optimization module 202, a database 204, a network connection 206, an output device 208, an aircraft flight line delivery milestone monitoring system 210, and a connection bus 212.

The optimization module 202 may be realized by a typical computer system that includes a processor coupled to a bus. Also coupled to the bus may be memory, a storage device, a keyboard, a graphics adapter, a pointing device, a network adapter, and the like. The output device 208 may be realized by a display unit that is coupled to the graphics adapter, a printer unit that is coupled to a print driver, or on a separate computer accessible via the network connection 206 and network adapter. The processor may be any general-purpose processor such as an INTEL® x86 compatible or SUN MICROSYSTEMS SPARC® central processing unit (CPU). The storage device may be any device capable of holding data, like a hard drive, compact disk read-only memory (CD-ROM), DVD, or some form of removable storage device. The memory holds instructions and data used by the processor. The pointing device may be a mouse, track ball, light pen, touch-sensitive display, or other type of pointing device and is used in combination with the keyboard to input data into the computer system. The graphics adapter displays images and other information on the display. The network adapter couples the computer system to a network and may be, for example, a token-ring, Ethernet, or digital subscriber line adapter or a cable or high-speed analog modem.

The optimization module 202 may be configured to perform aspects of the method 100. For example, it may be configured to receive a set of milestones 214 for flight line delivered of a set of aircraft to be delivered, receive a set of scheduling constraints 218 associated with the set of aircraft to be delivered, and determine a flight line delivery schedule 222 for the set of aircraft. The flight line delivery schedule for the set of aircraft may comprise a minimized cost for the flight line delivery of the set of aircraft. The output device 208 is configured to output the determined flight line delivery schedule 222.

In some embodiments, the optimization module 202 is further configured to receive a set of costs 216 for the milestones in the set of milestones. In such an embodiment, determining the flight line delivery schedule for the set of aircraft comprises generating a network flow chart 400 (discussed with FIG. 4) for each aircraft in the set of aircraft to be delivered. The network flow chart is based on the set of scheduling constraints. A cost for completion, e.g. cost of flight line delivery 220, of each milestone in the set of milestones along the network flow chart is determined for each aircraft in the set of aircraft to be delivered. As disclosed herein, receiving of information may comprise receiving data (e.g., a computer file) via the network connection 206, having a user input information via a user interface, and the like. Further, outputting may include outputting information via the output device 208 or transmitting via the network connection 206 for outputting of data via a separate component.

In some embodiments, outputting the flight line delivery schedule comprises displaying the flight line delivery schedule in a dashboard view. The dashboard view may include a Gantt chart displaying the scheduled milestones for aircraft to be delivered, depict utilization of each resource, project scheduled flights, and the like. A user may be able to interact with the dashboard view (e.g., via the pointing device and keyboard, via voice input) to update the flight line delivery schedule, view generated flight line delivery reports 224, and the like. Additional features available via the dashboard view include filtering data for customers, individual aircraft, subsets of aircraft, information for specific milestones, and the like.

The optimization module 202 may be configured to receive inputs from the aircraft flight line delivery milestone monitoring system 210. These inputs may be utilized in generating the flight line delivery reports 224, updating the flight line delivery schedule 222, and the like.

In performing the method 100, the optimization module 202 may be configured to process the various milestones 214, constraints 218, and costs 216 to deliver the aircraft. Equations (1) and (2) depict two decision variables for use in determining the aircraft flight line delivery schedule per the method 100.

$$x_{i,j,t,y}^a = \begin{cases} 1, & \text{if aircraft a moves from milestone } i \text{ to} \\ & \text{milestone } j \text{ at time } t \text{ using option } y, \\ 0, & \text{else} \end{cases} \quad (1)$$

$$w_{i,t} = \begin{cases} 1, & \text{if maintenance is schedule for paint hanger } i \text{ at time } t, \\ 0, & \text{else} \end{cases} \quad (2)$$

In performing block 102, the optimization module 202 receives a set of milestones 214 for flight line delivery of the plurality of the aircraft. The set of milestones 214 may be represented by $\mathbb{N}$ and may include a subset of mandatory milestones represented by $\mathbb{M}$.

In performing block 106, the optimization module 202 receives a set of scheduling constraints 218. In general, the scheduling constraints 218 include the required aspects of the schedule that must be observed, or cannot be violated, when determining the aircraft flight line delivery schedule 222 for the flight line delivery of the plurality of aircraft. Example constraints in the set of scheduling constraints 218 may be represented by the equations (3)-(8). For example, equation (3) represents an example flow balance constraint for tracking the progression of each aircraft, a, in the set of aircraft $\mathbb{A}$.

$$\sum_{j \in \mathbb{N}} \sum_{t'=t+1}^{T} \sum_{y \in Y_{i,j,t}^a} x_{i,j,t,y}^a - \sum_{j \in \mathbb{N}} \sum_{t'=r_a}^{t-1} \sum_{y \in Y_{j,i,t'}^a} x_{j,i,t',y}^a = b_i^a, \quad (3)$$

$$\forall i \in \mathbb{N}, \forall t \in \{r_a, \ldots, T\}, \forall a \in \mathbb{A}$$

In equation (3), j represents the milestones in the set of milestones, $\mathbb{N}$, for each day, t, from the rollout day for each aircraft, $r_a$, through the end of the month, T The term $b_i^a$ represents the supply and demand for of the milestone nodes, i, for each aircraft, a, with b having a value of 1 for a first milestone (e.g., a rollout milestone), having a value of −1 for a final milestone (e.g., a delivery milestone), and having a value of 0 for all other milestones.

Equation (4) provides for the constraint that the total number of aircraft scheduled for each milestone on a day, t, cannot exceed the capacity, $U_i$, of that milestone. Here, the term $f_{i,y}^a$ represents a nominal calendar flow of milestone i using option y for aircraft a.

$$\sum_{a \in \mathbb{A}} \sum_{j \in \mathbb{N}} \sum_{y \in Y_{i,j,t}^a} \sum_{t'=t-f_{i,y}^a+1}^{t} \mu_{y,t'} \cdot x_{i,j,t',y}^a \le U_i - w_{i,t}, \quad (4)$$

$$\forall i \in \mathbb{N}, \forall t \in \{1, \ldots, T\}$$

Equation (5) provides for the constraint that each mandatory milestone must be scheduled for each aircraft.

$$\sum_{j \in \mathbb{N}} \sum_{t=r_a}^{T} \sum_{y \in Y_{i,j,t}^a} x_{i,j,t,y}^a \ge 1, \forall i \in \mathbb{M}, \forall a \in \mathbb{A} \quad (5)$$

Equation (6) provides for the constraint of a paint hanger maintenance requirement. For example, a paint hanger maintenance requirement may be that there should be one preventative maintenance day per month for each paint hanger in the set of paint hangers, $\mathbb{P}$.

$$\sum_{t=1}^{T} w_{i,t} = 1, \forall i \in \mathbb{P} \quad (6)$$

Equation (7) provides for the constraint that one paint hanger must be scheduled for each aircraft.

$$\sum_{i \in \mathbb{P}} \sum_{j \in \mathbb{N}} \sum_{t=r_a}^{T} \sum_{y \in Y_{i,j,t}^a} x_{i,j,t,y}^a = 1, \forall a \in \mathbb{A} \quad (7)$$

Equation (8) provides for the constraint that no concurrent paint milestone starts if in the same livery, except if multiple sets of tools, $v_c$, for a set of aircraft for a customer c, $\mathbb{A}^c$ are available.

$$\sum_{a \in \mathbb{A}^c} \sum_{i \in \mathbb{P}} \sum_{j \in \mathbb{N}} \sum_{y \in Y_{i,j,t}^a} x_{i,j,t,y}^a \le v_c, \forall c \in \mathbb{C}, \forall t \in \{1, \ldots, T\} \quad (8)$$

The optimization module 202 may perform the steps of generating a network flow chart 400 (block 108) and determining a cost of flight line delivery 220 for each aircraft in the plurality of aircraft (block 110) as detailed throughout. Determining the aircraft flight line delivery schedule 222 for flight line delivery of the plurality of aircraft may be based on reducing a total cost for flight line delivery of the plurality of aircraft. For example, the optimization module 202 may utilize equation (9) to minimize the total cost, z, of scheduling all of the milestones for all of the aircraft.

$$\text{Min} z = \sum_{a \in \mathbb{A}} \sum_{(i,j) \in \mathbb{N}} \sum_{t=r_a}^{T} \sum_{y \in Y_{i,j,t}^a} c_{i,j,t,y}^a x_{i,j,t,y}^a \quad (9)$$

INDUSTRIAL APPLICABILITY

The teachings of the present disclosure have wide uses throughout industry. In one non-limiting example, the aircraft flight line delivery schedule optimizer system 200 may be used, in conjunction with the equations (1)-(9), to perform the method 100 to determine an aircraft flight line delivery schedule for flight line delivery (e.g., completion of post-production delivery milestones) of a plurality of aircraft.

FIG. 3 depicts an example flow path for flight line delivery of an aircraft, in accordance with an embodiment of the present disclosure. In particular, FIG. 3 depicts the flow path 300 depicting the various possible order of milestones to deliver an aircraft for a customer. The ordering of the milestones in the flow path 300 may be based on the set of milestones 214, the set of mandatory milestones, customer requirements from the customer profile, and the like. Here, the flow path 300 includes a rollout milestone 302, a plurality of paint milestones 304, an inspection milestone 306, a first flight milestone 308, a second flight milestone 310, a ticket event milestone 312, a customer flight milestone 314, a customer walkthrough milestone 316, and a delivery milestone 318. In this example, the test flight milestone is separated into the first flight milestone 308 and the second flight milestone 310.

In developing the flow path 300, the rollout milestone 302 is the first milestone scheduled, from which the aircraft may proceed to the inspection milestone 306 or the first opportunity to schedule the paint milestone at 304-1. Here, the aircraft may be painted at any time after the rollout milestone 302 and before either of the customer flight milestone 314 or the customer walkthrough milestone 316. Thus, the aircraft may be scheduled to complete the paint milestone directly after the rollout milestone 302 at 304-1, after the inspection milestone 306 at 304-2, after the first flight milestone 308 at 304-3, or after the second flight milestone 310 at 304-4. Additional constraints may require that the inspection milestone 306 be scheduled before the first flight milestone 308, and the first flight milestone 308 be completed before the second flight milestone 310. The customer profile may designate that the ticket event milestone 312 may only be scheduled after both the customer flight milestone 314 and the customer walkthrough milestone 316 are scheduled, but the customer walkthrough milestone 316 and the customer flight milestone may be scheduled in any order after the aircraft is scheduled to complete the second flight milestone 310 and the paint milestone (whether painted at 304-1 to 304-4).

FIG. 4 depicts a network flow chart, in accordance with an embodiment of the present disclosure. In particular, FIG. 4 depicts the network flow chart 400 that includes a plurality of nodes that correspond to the milestones of the flow path 300. As provided in the network flow diagram key 420, the network flow chart 400 depicts the possible flows through the flow path 300 from milestone i (node 422), to milestone j (node 424). The total capacity of milestone i (426) is depicted under or above each node and the total capacity of milestone j (428) is depicted under or above each node. The number of days to transition between nodes is depicted as a flow number (430) between the nodes 422 and 424.

In the network flow chart 400, like-numbered nodes correspond to like-numbered milestones of the flow path 300. For example, the node 402 corresponds to the rollout milestone 302, the node 404 represents each of the opportunities for the paint milestone 304-1 through 304-4 to be scheduled, the node 406 corresponds to the inspection milestone 306, and so on, with the node 418 corresponding with the delivery milestone 318.

In viewing the network flow chart 400, it is seen that the aircraft may be scheduled to be painted (node 404) after the rollout milestone (node 402), the inspection milestone (node 406), the first flight milestone (node 408), or the second flight milestone (node 410) are scheduled as indicated by the flow arrows from those nodes to the node 404. Here, the node 404 includes flow path arrows from the node 402, the node 406, the node 408, and the node 410, corresponding to these associated milestones. Accordingly, the aircraft may proceed from painting to being scheduled to perform the inspection milestone (node 406), the first flight milestone (node 408), the second flight milestone (node 410), the customer flight milestone (node 414), and the customer walkthrough milestone (node 416) as flow arrows from the node 404 proceed to each of those associated nodes.

As depicted by the network flow chart 400, the duration of a transition from one milestone to another may vary. For example, after being painted at node 404 it may take 3-6 days to proceed to the second flight milestone at node 410. Alternatively, it may only take one day to transition from the first flight milestone at node 408 to the second flight milestone at node 410.

Figure 5B:
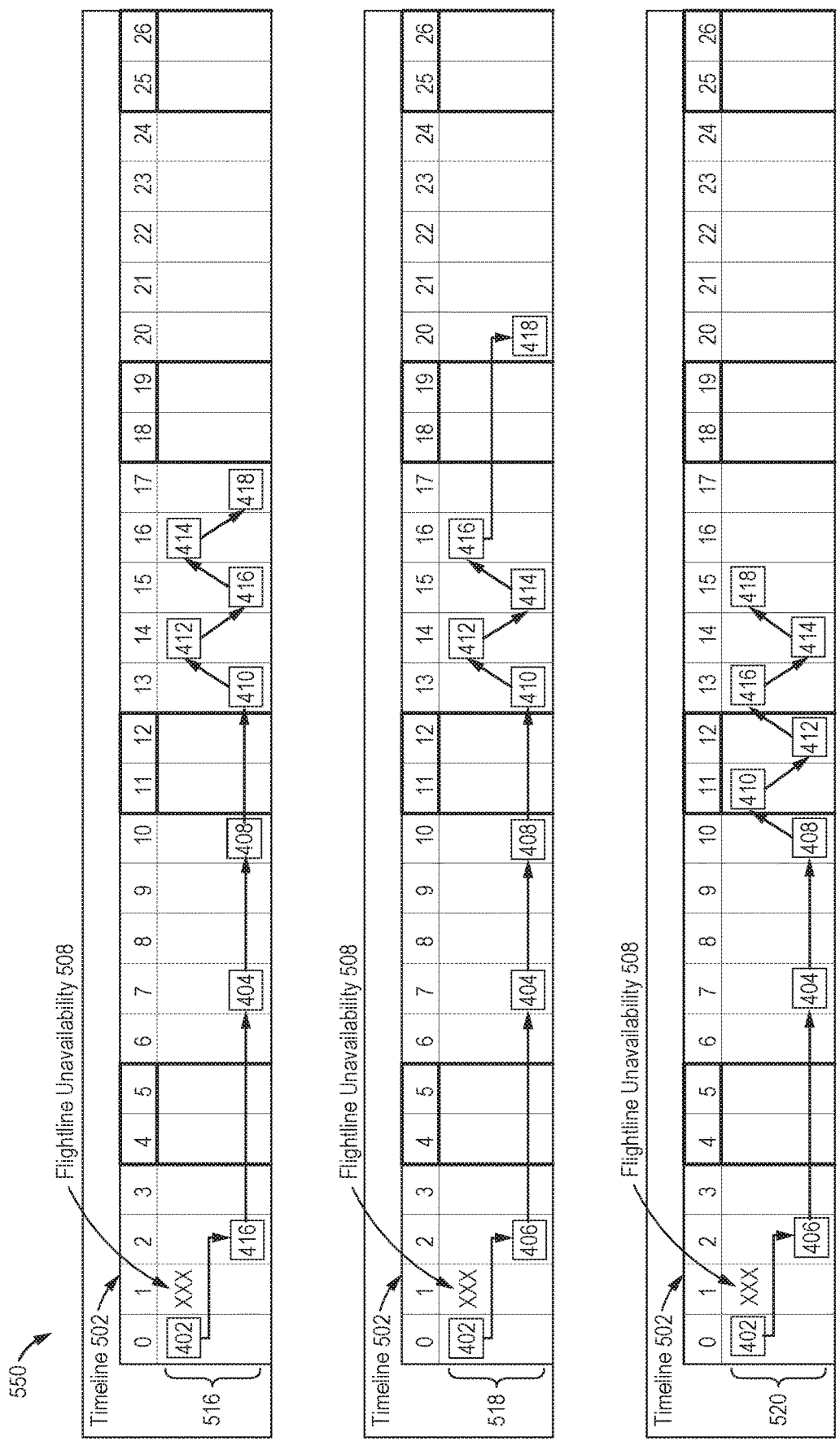

FIGS. 5A and 5B depict views of a plurality of time-expanded networks, in accordance with an embodiment of the present disclosure. In particular, FIG. 5A depicts the view 500 that includes a timeline 502, and a first through fourth time-expanded network 504, 506, 510, and 512. FIG. 5B depicts the view 550 that also includes the timeline 502, and a fifth through seventh time-expanded network 516, 518, and 520. The time-expanded networks presented in FIGS. 5A and 5B represent different possible flight line delivery timelines (e.g., scheduling of milestones) for flight line delivery of a single aircraft.

The network flow chart 400 of FIG. 4 may be converted into a time-expanded network, such as those depicted in FIGS. 5A and 5B. At the tops of the views 500 and 550 is the timeline 502 that indicates calendar days for the scheduling period. Here, there are five work days (e.g., Monday-Friday) separated by two weekend days (e.g., Saturday and Sunday). In the timeline 502, the weekend days are depicted with bold boxes and occur on Days 4, 5, 11, 12, 18, 19, 25, and 26. The remaining days on the timeline 502 are work days. The timeline 502 may be utilized for each of the time-expanded networks of the view 500.

In a first time-expanded network 504, the inspection milestone (node 406) is scheduled to occur before the paint milestone (i.e., 304-1) (node 404). The rollout occurs on Day 0 at the node 402. The duration of the transition from node 402 to the node 406 is one day, and thus the node 406 occurs on the next day, Day 1. The remaining milestones are scheduled with the painting milestone (node 404) being scheduled on Day 6, the first flight milestone (node 408) on Day 9, and the second flight milestone (node 410) on Day 10, which is the last work day before the weekend Days 11 and 12. Thus, the next opportunity to schedule the ticket event milestone (node 412) is the next available work day at Day 13, followed in succession by the customer flight milestone (node 414) on Day 14, the customer walkthrough milestone (node 416) on Day 15, and the delivery milestone (node 418) on Day 16. Thus, the first time-expanded network 504 represents one possibility of scheduling the milestones for the associated aircraft.

A second time-expanded network 506 depicts a modification to the first time-expanded network 504 in the event that a flightline stall is not available on Day 1 that is required to perform the inspection milestone (node 406). Here, as indicated by the flightline unavailability 508, the node 406 is not scheduled to occur on Day 2 like in the first time-expanded network 504. As a cascading effect, this results in the first flight milestone (node 408) being scheduled on Day 10, the last work day before the weekend Days 11 and 12. Thus, the remainder of the milestones are scheduled to be completed on Days 13-17 on the following work days after the weekend. Thus, in the second time-expanded network 506 the aircraft is scheduled to complete its delivery milestone (node 418) on Day 17, or one day after it was scheduled to complete its delivery milestone as compared to the first time-expanded network 504. This was due to the flightline unavailability 508 delaying the inspection milestone (node 406) by one day.

The third time-expanded network 510 depicts a modification to the second time-expanded network 506 that analyzes for the effects of scheduling the paint milestone (node 404) before the inspection milestone (node 404) because of the flightline unavailability 508. In this third time-expanded network 510, the paint milestone 304-1 (i.e., scheduling the paint milestone directly after the rollout milestone) from the flow path 300 is scheduled on Day 1 as depicted by the node 404 being scheduled on Day 1. The next available day to schedule the inspection milestone (node 406) is Day 6. This permits scheduling of the first flight milestone (node 408) on Day 9. At this point, the third time-expanded network 510 is restored to matching the remainder of the first time-expanded network from Days 10-16. Thus, the remainder of the milestones are able to be completed as they were scheduled in the first time-expanded network 504 on Days 13-16. As a result of scheduling the paint milestone (node 404) before the inspection milestone (node 406), the delivery milestone (node 418) is restored to Day 16, the same as scheduled in the first time-expanded network 504 and one day sooner than the second time-expanded network 506.

The fourth time-expanded network 512 depicts a modification to the third time-expanded network 510 that analyzes for the effects of inserting a constraint that a paint hanger is not available for either of Days 1 or 2 in addition to the flightline unavailability 508. The paint-hanger unavailability is depicted as a paint-hanger unavailability 514 in the fourth time-expanded network 512. Here, the rollout milestone (node 402) is still scheduled at Day 0, but there is both a flightline unavailability 508 that precludes scheduling the inspection milestone on Day 1 and a paint-hanger unavailability 514 that precludes scheduling the painting milestone on Days 1 and 2 as was scheduled in the third time-expanded network 510. In the fourth time-expanded network 512, the paint milestone (node 404) is scheduled on Day 3, followed by the inspection milestone (node 406) on Day 8. The remainder of the milestones are scheduled in sequence, with the final delivery milestone (node 418) being scheduled on Day 20, or four days after the scheduled delivery milestone from the first time-expanded network 504. It may be appreciated that an alternate time-expanded network may be analyzed that accounts for the costs and delays of painting the aircraft at a third-party paint facility.

The fifth time-expanded network 516 depicts a modification to the second time-expanded network 506. In the fifth time-expanded network 516, the flightline unavailability 508 remains, but a constraint in the customer profile now requires scheduling of the customer walkthrough milestone (node 416) before the customer flight milestone (node 414). Such a constraint may produce an alternate version of the both the flow path 300 and the network flow chart 400 that eliminates the flow path from the customer flight milestone 314 to the customer walkthrough milestone 316, and from the node 414 to node 416, respectively. Thus, as compared to the second time-expanded network 506, the scheduling of the customer walkthrough milestone (node 416) and the customer flight milestone (node 414) have been swapped, still resulting in the delivery milestone (node 418) occurring on Day 17, the same as in the second time-expanded network 506.

A sixth time-expanded network 518 depicts a modification to the fifth time-expanded network 516 that includes a constraint that the customer only accepts deliveries on the third work-day of each week (e.g., on Wednesdays). Thus, in this scenario, the customer only accepts deliveries on Day 1, Day 8, Day 15, and Day 22 on the timeline 502. As seen in the fifth time-expanded network 516, the aircraft is scheduled to be delivered on Day 17, the fifth work day (e.g., a Friday). Thus, the aircraft will not be able to be delivered until the next third work day, here Day 22 which is an additional five days later than it would be if the customer accepted deliveries on the fifth work day (e.g., Day 17). This additional delay may be associated with a cost, such as a storage cost, occupation of some capacity that could be used for flight line delivery of other aircraft in the plurality of aircraft, a penalty cost for being late for a requested delivery date, and the like.

A seventh time-expanded network 520 depicts a modification to the sixth time-expanded network 518 in an attempt to move the scheduled delivery of the aircraft to Day 15, the acceptable delivery day prior to Day 22 for the associated customer. An acceptable delivery day may be a scheduling constraint that indicates which days a customer accepts delivery of an aircraft. In the seventh time-expanded network 520, a network flow path is selected that analyzes and accounts for extra overtime costs for completing the second flight milestone (node 410) and the ticket event milestone (node 412) on weekend days of Day 11 and Day 12 (e.g., Saturday and Sunday).

Here, the seventh time-expanded network 520 schedule is the same as the sixth time-expanded network 518 through Day 10, with the milestones associated with nodes 402, 406, 404, and 408 being scheduled on Day 0, Day 2, Day 7, and Day 10, respectively.

However, in the seventh time-expanded network 520, the second test flight milestone (node 410) is scheduled on weekend day Day 11, followed by the ticket event milestone (node 412) being scheduled on weekend day Day 12. Performance of these milestones on weekend days includes an extra cost (e.g., from increased overtime labor costs that are higher than normal labor costs). However, scheduling these milestones sooner allows for scheduling of the customer walkthrough milestone (node 416) on Day 13 and the customer flight (node 414) on Day 14. Thus, it is now possible to deliver the aircraft to the customer (node 418) on Day 15, or a whole week sooner than the scheduled delivery per the sixth time-expanded network 518. This eliminates any extra costs associated with the aircraft being idle in the delivery flow path between Day 17 through Day 21.

Figure 6B:
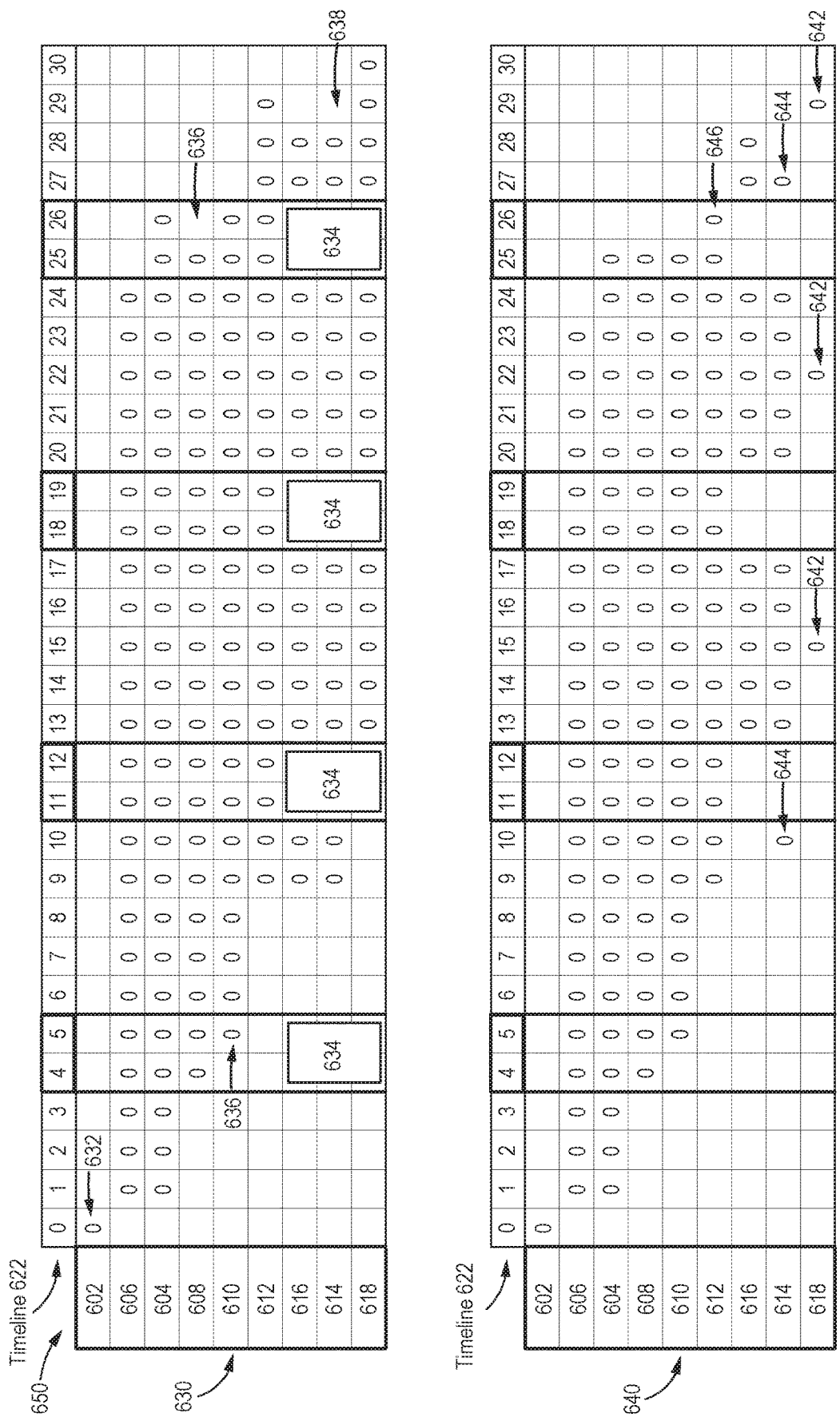

FIGS. 6A and 6B depict views of a plurality of steps of modeling a network flow chart, in accordance with an embodiment of the present disclosure. In particular, FIG. 6A depicts the view 600 of a first scheduling model 620 presented along with a timeline 622. FIG. 6B depicts a view 650 of a second scheduling model 630 and a third scheduling model 640 presented along with the timeline 622. The views 600 and 650 include the timeline 622, that is similar to the timelines 502 of FIGS. 5A and 5B, but extends from Day 0 to Day 30. Here, weekend days (e.g., Saturday and Sunday) appear on Days 4, 5, 11, 12, 18, 19, 25, and 16, and each pair of weekend days are separated by five consecutive work days (e.g., Monday-Friday). In the scheduling models 620, 630, and 640, a circle indicates possible days a milestone may be scheduled. Like in FIG. 4, like-numbered components represent similar milestones. Here, the row 602 represents all of the possible days that the rollout milestone 302 may be performed. This continues for row 606 for the inspection milestones 306, row 604 for the paint milestones 304, row 608 for the first flight milestones 308, row 610 for the second flight milestones, row 612 for the ticket event milestones, row 616 for the customer walkthrough milestones, row 614 for the customer flight milestone, and row 618 for the delivery milestone.

In the first scheduling model 620, none of the constraints or network flow diagram are applied, so any milestone may be schedule on any day, thus providing a vast number of possible ways to schedule the flight line delivery of the aircraft. As explored in the scheduling models 630 and 640, additional pruning, or removing of inconsistent or unachievable paths through the network flow chart, is performed in order to improve efficiency and performance of the scheduling.

In the second scheduling model 630, it can be seen at 632 that the rollout milestone (row 602) may only be performed on Day 0, and that all other milestones must happen after the rollout milestone (row) 602 because no other milestones (rows 604-618) are possible to be scheduled on Day 0. It can be seen at 634, that none of the customer flight milestones (row 614), customer walkthrough milestones (row 616), or the delivery milestones (row 618) may be performed on a weekend day, thus eliminating performance of these milestones on the weekend days. It can be seen that at 636 that the first flight milestone (row 608) must be scheduled before the second flight milestone (row 610), thus eliminating the possibility of performing the second flight milestone (row 610) on Day 4 and the first flight milestone (row 608) on Day 26. At 638, near the end of the flight line delivery timeline, it can be seen that the delivery milestone (row 618) is the final milestone to be scheduled, thus omitting any other milestones from being scheduled on Day 30. Further, the ticket event milestone (row 612) must be scheduled after both of the customer flight milestone (row 614) and the customer walkthrough milestone (row 616) which eliminates performance of these milestones on Day 29. These, and other aspects of the constraints applied to the network flow diagram, may be utilized to further increase the efficiency of determining the flight line delivery schedule.

In the third scheduling model 640, the additional constraints of performing the customer walkthrough milestone (row 616) before the customer flight milestone (row 614) and the end customer only accepting scheduling of the delivery milestone (row 618) on the third work day is included to further prune the possible network flow paths. Further, in some embodiments the ticket event milestone (row 612) may be scheduled before either of the customer flight milestone (row 614) or the customer walkthrough milestone (row 616). In other alternative embodiments, the ticket milestone cannot be scheduled before a customer walkthrough or a customer flight milestone, and the scheduling model 640 may further be pruned to eliminate instances of the ticket event milestone (row 612) from occurring before both of the customer walkthrough milestone (row 616) and the customer flight milestone (row 614) are completed. These, and other aspects, may be included as a constraint from the customer profile.

As a result of these additional constraints, the second scheduling model 630 is further pruned, or reduced, to the third scheduling model 640. At 642, the delivery milestone (row 618) only appears on Days 15, 22 and 29 as these are the only possible days the customer accepts performance of this milestone. Of note, Day 8 does not include a possible scheduling of the delivery milestone (row 618) because it is impossible to complete the milestones in the set of required milestones before Day 8 with a given rollout date of Day 0. At 644, it can be seen that the customer walkthrough milestone is not able to be scheduled on Day 28 because Day 28 is the final day the customer flight milestone (row 614) may be completed and the walkthrough must be completed before the customer flight, per the customer profile. Further, in some embodiments, the ticket event milestone (row 612) is only able to be completed before the customer walkthrough milestone (row 616) and the customer flight (row 614). As such, as seen at 646, the options to schedule the ticket event milestone during Days 27, 28, and 29 are removed from the possible scheduling dates.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A method of determining an aircraft flight line delivery schedule for a flight line delivery of a plurality of aircraft, the method comprising:
   receiving, by a processor, a set of milestones for the flight line delivery of the plurality of aircraft, wherein the plurality of aircraft includes a first aircraft;
   receiving, by the processor, a set of costs for the set of the milestones;
   receiving, by the processor, a set of scheduling constraints;
   generating, by the processor, a network flow chart for each aircraft in the plurality of aircraft, the network flow chart having an order of the milestones for the flight line delivery of the aircraft;
   determining, by the processor, a cost of the flight line delivery for a plurality of different orderings of the milestones for each aircraft in the plurality of aircraft based on the network flow chart and the set of costs for the set of the milestones;
   determining, by the processor, the aircraft flight line delivery schedule for the flight line delivery of the plurality of aircraft based on reducing a total cost for the flight line delivery of the plurality of aircraft; and
   outputting the determined aircraft flight line delivery schedule, the outputting including:
   generating work orders for completion of the milestones of the aircraft flight line delivery schedule;
   allocating resources for completion of the milestones;
   transmitting the aircraft flight line delivery schedule to an output device;
   receiving, by the processor, at least one input from an aircraft flight line delivery milestone monitoring system, wherein the aircraft flight line delivery milestone monitoring system is in communication with the processor and is configured to monitor completion of scheduled milestones, and the aircraft flight line delivery milestone monitoring system is configured to detect that the first aircraft entered a paint hanger at a first time, and the at least one input is indicative that the first aircraft entered the paint hanger at the first time:
   in response to receiving the at least one input from the aircraft flight line delivery milestone monitoring system that is indicative that the first aircraft entered the paint hanger at the first time, updating in real-time, by the processor, the aircraft flight line delivery schedule to produce an updated version of the aircraft flight line delivery schedule;
   transmitting to the output device a change notification identifying a scheduling difference between the updated version and the aircraft flight line delivery schedule previously transmitted to the output device; and
   wherein the set of scheduling constraints comprises a paint hanger capacity, the aircraft flight line delivery milestone monitoring system includes at least one of an RFID location system or a visual camera-based detection system configured to detect that the first aircraft entered the paint hanger at the first time, the at least one input is a first input, the method further includes receiving, by the processor, a second input from the aircraft flight line delivery milestone monitoring system, the aircraft flight line delivery milestone monitoring system is configured to detect that the first aircraft left the paint hanger at a second time, the second input is indicative that the first aircraft left the paint hanger at the second time, the method further comprises updating in real-time, by the processor, the aircraft flight line delivery schedule in response to determining that the first aircraft left the paint hanger at the second time to produce the updated version of the aircraft flight line delivery schedule, the set of the milestones includes a paint milestone, and the painting milestone is completed during a duration between the first time and the second time.

2. The method of claim 1, wherein the set of the milestones comprises at least one of: a rollout milestone, the paint milestone, an inspection milestone, a customer walk through milestone, a test flight milestone, a customer flight milestone, a ticket even milestone, and a delivery milestone.

3. The method of claim 1, wherein the set of scheduling constraints comprises customer profiles, the aircraft flight line delivery milestone monitoring system is configured to access an electronic flight log of the first aircraft to determine that a pilot making a flight-log entry for a test flight for the first aircraft means a completion of a test flight milestone, the method further comprises receiving, by the processor, a third input from the aircraft flight line delivery milestone monitoring system, the third input is indicative that the test flight milestone has been completed, the method comprising updating in real-time, by the processor, the aircraft flight line delivery schedule in response to receiving the third input from the aircraft flight line delivery milestone monitoring system that is indicative that the test flight milestone has been completed to produce the updated version of the aircraft flight line delivery schedule.

4. The method of claim 3, wherein the customer profiles comprise customer flight requirements and acceptable customer delivery days.

5. The method of claim 1, wherein the set of scheduling constraints comprises a milestone duration.

6. The method of claim 1, wherein determining a cost of a flight line delivery for each aircraft in the plurality of aircraft based on the network flow chart and the set of costs for the set of milestones comprises determining a cost of a milestone of painting the aircraft at both an in-house paint hanger and at an out-sourced paint hanger.

7. The method of claim 1, wherein determining a cost of flight line delivery for each aircraft in the plurality of aircraft based on the network flow chart and the set of costs for the set of the milestones comprises determining a cost of a milestone of painting an aircraft during normal labor costs and determining a cost of a milestone of painting an aircraft during overtime labor costs.

8. The method of claim 1, wherein outputting the determined aircraft flight line delivery schedule further comprises displaying the aircraft flight line delivery schedule in a dashboard view, the aircraft flight line delivery milestone monitoring system is in communication with a maintenance database computer, the aircraft flight line delivery milestone monitoring system is configured to access the maintenance database computer to detect that the first aircraft entered the paint hanger at the first time.

9. The method of claim 1, further comprising generating a flight line delivery report based on the aircraft flight line delivery schedule.

10. The method of claim 9, further comprising monitoring completion of the scheduled milestones via the aircraft flight line delivery milestone monitoring system, and generating flight line delivery reports which comprises analyzing completed milestones compared to the scheduled milestones.

11. An aircraft flight line delivery schedule optimizer system comprising:
an output device and an optimization module, the optimization module including a processor configured to:
receive a plurality of milestones for the flight line delivery of a set of aircraft to be delivered;
receive a set of scheduling constraints associated with the set of aircraft to be delivered;
determine a cost of flight line delivery for a plurality of different orderings of the milestones; and
determine a flight line delivery schedule for the set of aircraft, the flight line delivery schedule for the set of aircraft comprising a minimized cost for flight line of the set of aircraft;
transmit the aircraft flight line delivery schedule to an output device
receive at least one input from an aircraft flight line delivery milestone monitoring system, wherein the aircraft flight line delivery milestone monitoring system is in communication with the processor, the aircraft flight line delivery milestone monitoring system is configured to monitor completion of scheduled milestones, the aircraft flight line delivery milestone monitoring system is configured to detect that the first aircraft entered a paint hanger at a first time, and the at least one input is indicative that the first aircraft entered the paint hanger at the first time;
wherein the set of scheduling constraints comprises a paint hanger capacity, the aircraft flight line delivery milestone monitoring system includes at least one of an RFID location system or a visual camera-based detection system configured to detect that the first aircraft entered the paint hanger at the first time, the at least one input is a first input, the method further includes receiving, by the processor, a second input from an aircraft flight line delivery milestone monitoring system, the aircraft flight line delivery milestone monitoring system is configured to detect that the first aircraft left the paint hanger at a second time, the second input is indicative that the first aircraft left the paint hanger at the second time, the method further comprises updating in real-time, by the processor, the aircraft flight line delivery schedule in response to determining that the first aircraft left the paint hanger at the second time to produce the updated version of the aircraft flight line delivery schedule, the set of milestones includes a paint milestone, and the painting milestone is completed during a duration between the first time and the second time,
in response to receiving the at least one input from the aircraft flight line delivery milestone monitoring system that is indicative that the first aircraft entered the paint hanger at the first time, update in real-time the aircraft flight line delivery schedule in response to a trigger event to produce an updated version of the aircraft flight line delivery schedule; and
transmit to the output device a change notification identifying a scheduling difference between the updated version and the aircraft flight line delivery schedule previously transmitted to the output device; and
the output device configured to output the determined flight line delivery schedule, the output device further configured to output the updated version or the change notification.

12. The aircraft flight line delivery schedule optimizer system of claim 11, wherein:
the processor is further configured to receive a set of costs for the plurality of the milestones; wherein:
determining the flight line delivery schedule for the set of aircraft comprises:
generating a network flow chart for each aircraft in the set of aircraft to be delivered, the network flow chart being based on the set of scheduling constraints; and
determining a cost for completion of each of the milestones in the plurality of the milestones along the network flow chart for each aircraft in the set of aircraft to be delivered.

13. The aircraft flight line delivery schedule optimizer system of claim 11, wherein the paint hanger capacity comprises an in-house paint hanger capacity and an out sourced paint hanger capacity.

14. The aircraft flight line delivery schedule optimizer system of claim 11, wherein the set of the milestones includes: a rollout milestone, the paint milestone, a customer walkthrough milestone, a test flight milestone, and a ticket event milestone.

15. The aircraft flight line delivery schedule optimizer system of claim 14, wherein the set of scheduling constraints comprises a paint hanger maintenance requirement.

16. The aircraft flight line delivery schedule optimizer system of claim 14, further comprising the aircraft flight line delivery milestone monitoring system, the aircraft flight line delivery milestone monitoring system configured to determine completion of scheduled flight line delivery milestones, the processor further configured to generate flight line delivery reports based on completed milestones and the scheduled milestones and the output device further configured to output the flight line delivery reports based on the completed milestones and scheduled milestones.

17. The aircraft flight lien delivery schedule optimizer system of claim 16, further configured to update the determined flight line delivery schedule for the set of aircraft based at least in part on the completed milestones.

18. The aircraft flight line delivery schedule optimizer system of claim 11, wherein the set of scheduling constraints comprises a paint hanger maintenance requirement.

\* \* \* \* \*

UNITED STATES PATENT AND TRADEMARK OFFICE
CERTIFICATE OF CORRECTION

PATENT NO. : 11,507,916 B2
APPLICATION NO. : 16/267064
DATED : November 22, 2022
INVENTOR(S) : Shabnam Khamooshi, Sharon Arroyo and Wallace C. O'Rear Page 1 of 1

It is certified that error appears in the above-identified patent and that said Letters Patent is hereby corrected as shown below:

In the Claims

Claim 2, Column 16, Line 67-Column 17, Line 1: "walk through" should read --walkthrough--;
Claim 2, Column 17, Line 2: "even" should read --event--;
Claim 6, Column 17, Line 27: "of milestones" should read --of the milestones--;
Claim 11, Column 17, Line 58: "the flight" should read --a flight--;
Claim 11, Column 17, Line 62: "of flight" should read --of the flight--;
Claim 11, Column 17, Line 63: "milestones; and" should read --milestones;--;
Claim 11, Column 18, Line 1: "the aircraft" should read --an aircraft--;
Claim 11, Column 18, Lines 1-2: "an output device" should read --the output device;--;
Claim 11, Column 18, Line 10: "the first" should read --a first--;
Claim 11, Column 18, Lines 20-21: "first input, the method further includes receiving" should read --first input, a second input is received--;
Claim 11, Column 18, Lines 21-22: "a second input from an" should read --from the--;
Claim 11, Column 18, Lines 27-29: "second time, the method further comprises updating in real-time, by the processor, the aircraft" should read --second time, the aircraft--;
Claim 11, Column 18, Lines 29-30: "schedule in response" should read --schedule is updated in real-time, by the processor, in response--;
Claim 11, Column 18, Lines 31-32: "the updated" should read --an updated--;
Claim 11, Column 18, Line 33: "the set of milestones" should read --a set of the milestones--;
Claim 11, Column 18, Line 36: "time," should read --time;--;
Claim 11, Column 18, Lines 41-42: "schedule in response to a trigger event to produce an" should read --schedule to produce the--;
Claim 11, Column 18, Line 43: "schedule; and" should read --schedule;--;
Claim 13, Column 19, Lines 1-2: "out sourced" should read --out-sourced--;
Claim 16, Column 19, Lines 13-16: "system, the aircraft flight line delivery milestone monitoring system configured to determine completion of scheduled flight line delivery milestones, the processor" should read --system, the processor--;
Claim 16, Column 19, Line 20: "and scheduled" should read --and the scheduled--;
Claim 17, Column 19, Line 21: "lien" should read --line--.

Signed and Sealed this
Second Day of April, 2024

Katherine Kelly Vidal
*Director of the United States Patent and Trademark Office*